United States Patent [19]

Cooper et al.

[11] Patent Number: 5,167,140
[45] Date of Patent: Dec. 1, 1992

[54] APPARATUS AND METHOD FOR INFUSING A MATERIAL INTO A CLOSED LOOP SYSTEM

[75] Inventors: B. William Cooper, Lloyd Harbor; Kenneth C. Leighley, Stony Brook, both of N.Y.

[73] Assignee: Spectronics Corporation, Westbury, N.Y.

[21] Appl. No.: 741,387

[22] Filed: Aug. 7, 1991

[51] Int. Cl.$^5$ ............................................. G01M 3/20
[52] U.S. Cl. ...................................................... 73/40.7
[58] Field of Search .................. 73/40.7, 40; 252/964

[56] References Cited

U.S. PATENT DOCUMENTS

| | | | |
|---|---|---|---|
| 1,982,325 | 11/1934 | Shepherd | 184/1 |
| 2,930,511 | 3/1960 | Vanderstrom | 222/3 |
| 3,276,635 | 10/1966 | Webster | 222/145 |
| 3,607,784 | 9/1971 | Mlot-Fijalkowski | 252/408 |
| 3,935,713 | 2/1976 | Olson | 62/77 |
| 3,937,029 | 2/1976 | Grahl et al. | 62/77 |
| 4,249,412 | 2/1981 | Townsend, III | 73/40.7 |
| 4,255,943 | 3/1981 | Stephenson | 60/655 |
| 4,378,681 | 4/1983 | Modisette | 62/500 |
| 4,535,802 | 8/1985 | Robertson | 137/322 |
| 4,612,798 | 9/1986 | Roberts | 73/40.7 |
| 4,693,118 | 9/1987 | Roberts | 73/40.7 |
| 4,745,772 | 5/1988 | Ferris | 62/292 |
| 4,758,063 | 7/1988 | Parekh | 252/68 |
| 4,776,174 | 10/1988 | Rich et al. | 62/77 |
| 4,938,063 | 7/1990 | Leighley | 73/40.7 |

FOREIGN PATENT DOCUMENTS 104750 4/1984 European Pat. Off. .
359449 3/1990 European Pat. Off. .

Primary Examiner—Hezron E. Williams
Assistant Examiner—Nashmiya Ashraf
Attorney, Agent, or Firm—Seidel, Gonda, Lavorgna & Monaco

[57] ABSTRACT

The invention provides an atomizing mist infuser and a method of using the same. This mist infuser includes a disposable capsule having a sealable inlet and outlet. This capsule defines a reservoir which is in open communication with the capsule's inlet and outlet. The reservoir is designed to hold a predetermined amount of a liquid material to be infused into a closed-loop system. In one embodiment, the capsule's outlet is designed to: (a) substantially prevent the liquid material held in the capsule's reservoir from flowing therethrough when the material is subjected to normal gravitational forces, and (b) atomize the liquid material held in the capsule's reservoir as the liquid material is forced, under pressure, to pass through the capsule's outlet. In another embodiment, the capsule's outlet is constructed to have a flow restriction-atomization device attached thereto. When this device is attached to the capsule's outlet, it is designed to: (a) substantially prevent the liquid material held in the capsule's reservoir from flowing therethrough when the material is subjected to normal gravitational forces, and (b) atomize the liquid material held in the capsule's reservoir as the liquid material is forced, under pressure, to pass through the capsule's outlet.

37 Claims, 4 Drawing Sheets

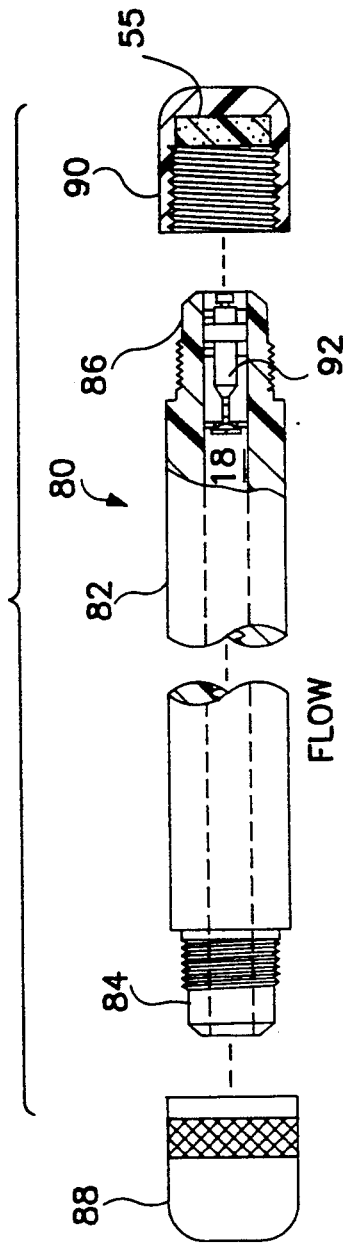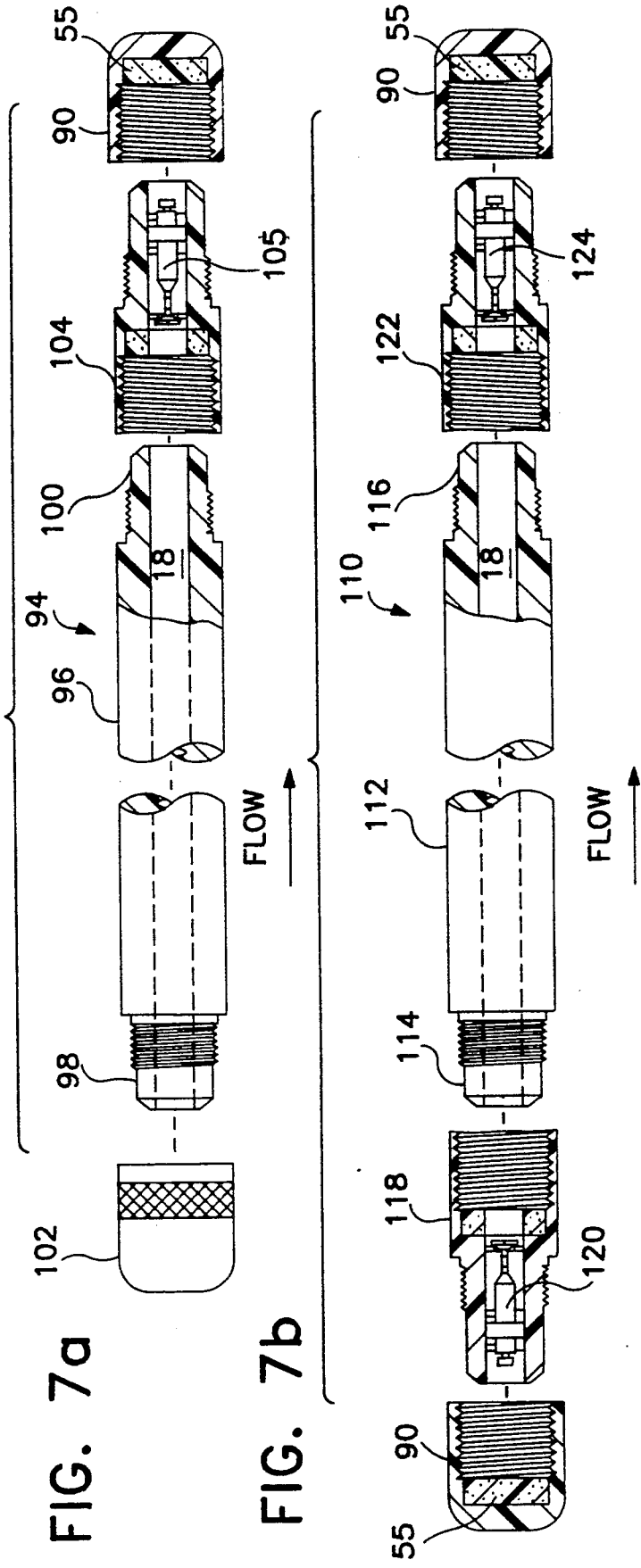
FIG. 7
FIG. 7a
FIG. 7b

APPARATUS AND METHOD FOR INFUSING A MATERIAL INTO A CLOSED LOOP SYSTEM

FIELD OF THE INVENTION

The present invention is directed to an apparatus and method for neatly and efficiently infusing, in an atomized form, a desired amount of a mixture into an operating, pressurized closed-loop system.

In particular, the invention is directed to an apparatus and method for infusing, in an atomized form, a mixture, comprising a predetermined amount of a leak detection composition, into an operating, pressurized closed-loop air conditioning or refrigeration system.

BACKGROUND OF THE INVENTION AND DESCRIPTION OF THE PRIOR ART

Until recently it was rather difficult to accurately detect leaks in operating, pressurized closed-loop systems (e.g., air conditioning and refrigeration systems). Often a serviceman or technician was required to interpret test results which were very vague and ambiguous. One method typically used was to employ a Halide torch. This method required the serviceman or technician to observe a particular color change when escaping system chloroflourocarbon refrigerant material (e.g., FREON®) came in contact with the torch flame. Other methods for leak detection employs the use of soap bubbles and/or electronic detectors.

Yet another method of leak detection employs the use of fluorescent leak detection compositions. Here a fluorescent leak detection composition is applied to the outer surface of a system's equipment or pipes. A composition which is suitable for this latter approach is disclosed in U.S. Pat. No. 4,249,412.

Not only were the test results of the aforementioned methods difficult to interpret, but also they often did not pinpoint the exact location of the leak or locate multiple leaks. In practice, the serviceman or technician would have difficulty showing a customer the exact location of the leak or leaks. In many cases, the serviceman was more apt to recharge the system with additional refrigerant rather than locating and repairing the existing leak.

In more recent years, it has become common practice in the automotive air conditioning field to provide one pound cans of a pre-mixed formulation of a refrigerant and a leak detection composition (e.g., a fluorescent dye and a lubrication oil) to be infused into an operating, pressurized closed-loop system. This practice allows system leaks to be reliably pinpointed when the refrigerant and fluorescent dye formulation is used in conjunction with an ultraviolet light.

Specifically, since the operating closed-loop system is under pressure, the fluorescent dye is forced outwardly through any existing holes, cracks and/or loose connections or fittings in the system; thereby, becoming clearly visible and highlighted to the human eye when subjected to the ultraviolet light source. One example of a method and apparatus especially suitable for the aforementioned pre-mixed formulation system is disclosed in the trade literature entitled "Spectroline ®Automotive Leak Detection Systems", available from Spectronics Corporation, of Westbury, N.Y.

Although the use of one pound cans was very common, in the past few years, many companies have since ceased to manufacture and/or distribute this product. One of the main reasons for the trend towards terminating the manufacturer and distribution of such one pound cans stems from the discovery that the refrigerant contained therein (i.e., chlorofluorocarbons) aid in destroying the earth's ozone layer.

Notwithstanding the above, there are still many definite advantages associated with employing infused premixed refrigerant/leak detection compositions for locating leaks in an operating, pressurized close-loop system. Some advantages of infusing a pre-mixed refrigerant/leak detection formulation, instead of relying on the aforementioned methods (e.g., use of halide torches, soap bubbles and/or electronic detectors), include: (1) being able to accurately pinpoint the exact source of the leak or leaks; (2) being able to positively recognize the leak without having to interpret the test results; (3) being able to directly show a customer the existing leak or leaks; and (4) making it practical for the leaks to be repaired rather than just refilling the system with additional refrigerant.

The importance of being able to detect and repair such leaks is two-fold. First, the efficiency of the system is reestablished following the necessary repairs. This conserves energy. Secondly, the amount of refrigerant escaping into the atmosphere is minimized; thereby, minimizing the depletion of the earth's ozone layer.

However, as stated earlier, although pre-mixed one pound cans containing a refrigerant and a leak detection composition performed satisfactorily, for the most part, such one pound cans are no longer being sold. Moreover, as also stated earlier, it is impractical, if not impossible, to neatly and efficiently charge large commercial air conditioning and refrigeration systems with the existing pre-mixed one pound can formulations.

When infusing a system with a pre-mixed leak detection formulation, it is most desirable to charge the system with as little carrier refrigerant as possible until the leak or leaks are located, since the refrigerant is often vented to the atmosphere when repairing the leak. However, if the refrigerant is not vented, it is often pumped from the system to an external storage tank to be re-used after the leak(s) has been repaired.

The use of pre-mixed cylinders of the refrigerant and leak detection composition formulations afford only a minimal degree of flexibility in controlling the amount of the leak detection composition to be added to a particular system. In large commercial air conditioning and refrigeration systems, the amount and concentration of the leak detection composition necessary to check for leaks will vary depending on the weight of the refrigerant charge and the oil charge of that system.

By employing the aforementioned prior art practices, nearly all systems will be either undercharged or overcharged as a result of the use of the pre-mixed cylinder formulations. Accordingly, if a serviceman or technician is to effectively detect leaks in a large commercial system, various quantities of a leak detection composition, in various concentrations, must be repeatedly infused into the system.

As mentioned above, improperly charging a system is highly undesirable since it has the potential of resulting in the following problems: (a) it can cause the escaping leak detection composition to be spilled onto the system equipment; (b) it can cause excess refrigerant to be vented to the atmosphere; and, (c) it can cause an improper ratio of lubrication oil to refrigerant to leak detection composition to be present in the system. This latter problem can be fatal to the closed-loop system due to there being an insufficient amount of oil present to lubricate the system and/or there being an insufficient amount of the fluorescent dye present which will result in a greatly reduced fluorescent effect of the leak detection composition.

Additionally, commercial air conditioning and refrigeration systems use not only various amounts of refrigerant but also various types of refrigerants. Examples of commercially useful refrigerants include: R-11, R-12, R-22, R-502, R-500, R-114, R-113, R-23, R-13, and R-503. The various types of refrigerants used preclude the practical stocking and supply of the correct concentrations and amounts of leak detection formulations necessary for every particular commercial system. Moreover, many types of dyes, such as DuPont's Dytel Red Visible Dye, manufactured by the E.I. DuPont de Nemours & Co. of Wilmington, Del., are normally only stocked by distributors in pre-mixed refrigerant/dye formulations containing R-12 and R-22 refrigerants.

Although they are highly effective in locating leaks within a closed-loop system, it should also be noted that the usefulness of visible dyes has diminished due to the improper use and control of such compositions. For example, since the amount of visible dye additions to closed-loop systems has not been controlled for various reasons, this often resulted with grossly overcharging the system being checked. Overcharging is highly undesirable, especially when fluorescent dyes are employed, since the fluorescent response of such dyes can be quenched if present in high concentrations.

The apparatus and method disclosed in U.S. Pat. No. 4,938,063 overcame many of the foregoing deficiencies by providing an apparatus and method for neatly and efficiently infusing a mixture comprising a leak detection composition and a system carrier fluid into an operating, pressurized closed-loop system for the purpose of detecting and pinpointing leaks. The invention disclosed in U.S. Pat. No. 4,938,063 accomplished this result in a manner which minimized the venting of system carrier fluid to the atmosphere, while providing a system carrier fluid and leak detection material mixture which was appropriate for a particular sized commercial system.

The apparatus disclosed in U.S. Pat. No. 4,938,063 comprises, among other things, a refillable sealed reservoir designed to hold a predetermined amount and concentration of a liquid material. If the apparatus is used for detecting leaks in an operating, pressurized closed-loop system, the liquid material comprises a leak detection composition.

When practicing the invention disclosed in U.S. Pat. No. 4,938,063, if, for example, the system being tested for leaks requires two ounces of a specific leak detection composition, and if the sealed, refillable, reservoir capacity is only one ounce, the serviceman or technician testing the system would generally perform the following steps: (a) fill the sealed, refillable, reservoir with a first one ounce supply of the desired leak detection composition in accordance with the process disclosed therein, (b) connect the sealed reservoir to the closed-loop system being tested, (c) discharge the contents of the reservoir into the system, (d) refill the reservoir with a second one ounce supply of the same leak detection composition, and (e) discharge the contents of the refilled reservoir into the system.

The aforementioned method is especially useful when using the refillable sealed reservoir to repeatedly discharge the same leak detection composition into the same closed-loop system. However, as stated earlier, there are many different types of refrigerants presently being employed. Since each refrigerant is miscible with only a limited group of compositions, when testing for leaks, it is imperative to employ a leak detection composition which is compatible therewith.

Specifically, in the air conditioning and refrigeration industry, chloroflourocarbon (CFC) compounds, such as dichlorodifluoromethane, have been used extensively for many years as refrigerants. Dichlorodifluoromethane, commonly referred to in the industry as "R-12", is the refrigerant of choice for many air conditioning systems such as automobile air conditioners.

However, it has recently been determined that, when CFC compounds are released to the atmosphere, they have the potential of damaging the earth's ozone layer. Consequently, the industry has sought to find a non-CFC substitute for such CFC refrigerants.

In response to this need, it has been discovered that hydrofluorocarbon (HFC) compounds can be used as refrigerants without having the adverse effects on the earth's ozone layer as do their CFC counterparts. One of the HFC compounds which the refrigeration and air conditioning industry has identified as a suitable substitute for CFC compound R-12 is 1,1,1,2-tetrafluoroethane, commonly referred to as "R-134a".

Although R-134a does not have any known deleterious effects on the earth's ozone layer, the industry noted that it is not a "drop-in" substitute for R-12 refrigerants. Specifically, conventional refrigeration systems which employ R-12 as the refrigerant generally use mineral oils to lubricate their compressor. This does not create a problem in such conventional systems since R-12 is completely miscible with mineral oils throughout the entire range of refrigeration system temperatures.

On the other hand, conventional refrigeration lubricants such as mineral oil cannot be employed with HFC compositions such as R-134a, since R-134a is not miscible with mineral oils. Consequently, if R-134a is employed in a refrigeration system it cannot come into contact with any mineral oil since doing so would create a serious problem. Specifically, since HFC compounds are immiscible with mineral oils, the blending of the two will not produce a homogeneous mixture. This will, in turn, contaminate and possibly damage the refrigeration system.

Moreover, one of the lubricants of choice for systems which employ R-134a is polyalkylene glycol (PAG). While PAG is very compatible with R-134a refrigerant, it cannot be used where there is a possibility of cross-contamination with systems which employ mineral oil as the lubricant (i.e., CFC-based systems). For example, the PAG will react with chloride remaining in the residual oil, or present as a residual in the supply tubes, hoses, mist infuser, etc. This reaction with the chloride ions will form a sludge which can be extremely harmful to the operation of the closed-loop system being checked.

Regardless of whether the refrigerant employed is a CFC compound or an HFC compound, it will always be necessary to detect the presence of leaks since air conditioning and refrigeration systems are pressurized "closed-loop" systems. If a single, sealed, refillable reservoir, similar to that disclosed in U.S. Pat. No. 4,938,063, is employed as part of an apparatus to detect leaks in both CFC-based and HFC-based closed-loop systems, a serious problem can occur due to the cross-contamination potential set out above.

There are many different types of CFC and HFC refrigeration compounds. Each compound has specific compositions with which it can be mixed. Therefore, in order to avoid the problems associated with cross-contamination, the user of an apparatus employing the sealed, refillable reservoir disclosed in U.S. Pat. No. 4,938,063 must either: (a) possess a large number of sealed, refillable reservoirs, each designated for employment with a specific refrigerant, or (b) thoroughly clean the sealed, refillable reservoir and connecting hoses after each use to remove all traces of a composition which may be incompatible with the system refrigerant, the carrier fluid, the leak detection material and/or the refrigeration lubricant.

As can be seen, either approach would be costly and/or time consuming. Therefore, since the trend in the industry is to shift over from CFC-based to HFC-based systems, the air conditioning and refrigeration industry would welcome a means and/or method for detecting leaks in operating, pressurized, closed-loop systems which efficiently and economically resolves the aforementioned problems, especially those associated with cross-contamination.

SUMMARY OF THE INVENTION

It is an object of the present invention to provide a means and a method for infusing an atomized leak detection composition into an operating, pressurized closed-loop system which efficiently and economically resolves the problems associated with cross-contamination.

Other objects, aspects and advantages of the present invention will become apparent to those skilled in the art upon reading the following detailed description when considered in connection with the accompanying drawings and appended claims.

The present invention accomplishes the objectives set out above by providing a novel disposable atomizing mist infuser and a method for infusing an atomized mixture into an operating, pressurized, closed-loop system.

The novel, atomizing mist infuser encompassed by one embodiment of the present invention comprises: a disposable capsule constructed and arranged to have a reservoir and a sealable inlet and outlet means in open communication therewith. The mist infuser capsule's reservoir is constructed and arranged to hold a predetermined amount of a liquid material to be dispersed into an operating, pressurized closed-loop system.

The novel atomizing mist infuser of the present invention is designed for a one-time use. Moreover, the mist infuser capsule's sealable outlet means encompassed by this embodiment of the present invention is constructed and arranged to: (a) substantially prevent the liquid material held in the mist infuser capsule's reservoir from flowing through the sealable outlet means when it is unsealed, and when the liquid material is subjected to normal gravitational forces, and (b) atomize the liquid material held in the mist infuser capsule's reservoir as the liquid material is forced, under pressure, to pass through the capsule's sealable outlet means when it is unsealed and connected to an operating air conditioning system.

The novel atomizing mist infuser of the present invention also comprises a means for coupling an externally available high pressure system carrier fluid supply to the mist infuser capsule's sealable inlet means. Moreover, the mist infuser comprises a means for coupling its capsule's sealable outlet means to an operating, pressurized, closed-loop system.

This latter coupling means allows for the flow of an atomized mixture from the mist infuser capsule's reservoir into the operating, pressurized closed-loop system through the capsule's sealable outlet means. This atomized mixture comprises both the high pressure system carrier fluid and the liquid material held within the mist infuser capsule's reservoir.

Another embodiment of the novel, atomizing mist infuser encompassed by the present invention comprises: a disposable capsule constructed and arranged to have a reservoir and a sealable inlet and outlet means in open communication therewith. In this embodiment, the capsule outlet means is constructed and arranged to have a flow restriction-atomizing means securely attached thereto. This flow restriction-atomization means comprises: a flow restriction portion which is constructed and arranged to substantially prevent any liquid material held within the capsule reservoir from flowing through the flow restriction-atomization means when (a) the outlet means is unsealed; (b) the flow restriction-atomization means is secured thereto; and (c) the liquid material contained in said capsule reservoir is subjected to normal gravitational forces. The flow restriction-atomization means further comprises a flow atomization portion which is constructed and arranged to atomize any liquid material held in the capsule reservoir, when the liquid material is forced, under pressure, to pass through the sealable capsule outlet means and the flow restriction-atomization means.

Regardless of the novel mist infuser embodiment employed, it is presently preferred that the capsule design be such that it will withstand the pressures that may be encountered in the specific operating closed-loop system. It is even more preferred that the capsule design be able to withstand pressures that may be encountered if the mist infuser is incorrectly installed and/or subjected to extreme conditions (e.g., if the mist infuser is connected to an overheated air conditioning or refrigeration system, and/or inadvertently connected to the high pressure side of an operating system.)

Yet another embodiment of the present invention encompasses a novel method for infusing an atomized leak detection composition into an operating, pressurized closed loop system. The novel method for infusing such an atomized mixture in accordance with the present invention comprises: selecting an atomizing mist infuser which comprises a disposable, capsule defining a reservoir constructed and arranged to contain a desired amount and concentration of a liquid material to be infused into a closed-loop system. This disposable capsule is constructed and arranged to have a sealable inlet and outlet means which are both in open communication with its reservoir. Prior to being employed, the capsule reservoir is filled with a leak detection composition; and, the capsule's inlet and outlet means are both sealed to prevent the contents within the capsule's reservoir from being contaminated.

After the specific disposable capsule is selected, its sealable outlet and inlet means are unsealed and coupled to an operating, pressurized closed-loop system, and an externally available high pressure system carrier fluid supply, respectively. The specific means of coupling the capsules inlet and outlet means to the aforementioned external systems depends, in part, on the specific embodiment of mist infuser employed.

After the couplings are made, an atomized mixture, comprising the liquid material contained within the atomizing mist infuser's disposable capsule and the high pressure system carrier fluid, is infused from the capsule's reservoir into the operating, pressurized closed-loop system. After the entire contents of the mist infuser's capsule reservoir has been discharged, the now empty capsule is decoupled from the closed-loop system and from the system carrier fluid supply and then discarded. Since the mist infuser's capsule is not refilled as in the prior art practices, the problem associated with cross-contamination is avoided.

In a preferred embodiment, the novel atomizing mist infuser is a hand held unit comprising a pre-filled, disposable capsule, wherein the capsule is constructed and arranged to have a reservoir containing a predetermined amount of a leak detection composition. The mist infuser's capsule is also constructed and arranged to have a sealable inlet and outlet means, which are both in open communication with the capsule's reservoir. The atomizing infuser of the present invention is constructed and arranged to be used once and then discarded.

In this preferred embodiment, the atomizing mist infuser is coupled at one end to a means for regulating and controlling the inflow of an externally available high pressure system carrier fluid into the mist infuser capsule's reservoir through the capsule's sealable inlet means. Once the system carrier fluid contacts the leak detection composition within the mist infuser capsule's reservoir, a high pressure system carrier fluid/leak detection composition mixture is formed. Also in this preferred embodiment, a conduit means containing a series of fittings and/or fasteners interconnects the mist infuser capsule's sealable outlet to the operating, pressurized closed-loop system.

When practicing the embodiment of the present invention, wherein the mist infuser capsule outlet is constructed and arranged to have a flow restriction portion and a flow atomization portion, as the high pressure carrier fluid/leak detection composition mixture passes therethrough, it is atomized. When practicing the embodiment of the invention wherein the capsule outlet means is constructed and arranged to have a flow restriction-atomization means attached thereto, the high pressure carrier fluid/leak detection composition mixture atomizes after passing from the capsule reservoir, through the flow restriction-atomization means.

Regardless of which mist infuser embodiment is employed, an atomized leak detection mixture is produced. This atomized mixture can then neatly and efficiently be directed into an operating, pressurized closed-loop system by any suitable conduit means.

After the contents of the specific mist infuser's capsule have been totally discharged, the atomizing mist infuser is decoupled from the carrier fluid supply regulating means and from the closed-loop system conduit means and then discarded. Since the atomizing mist infuser is discarded after its contents have been discharged into the system, the problems associated with cross-contamination are avoided.

BRIEF DESCRIPTION OF THE DRAWINGS

For the purpose of illustrating the invention, there is shown in the drawings embodiments which are presently preferred. It is understood, however, that this invention is not limited to the precise arrangements and instrumentalities shown therein. A brief description of the drawings are as follows:

FIG. 3 is a sectional view of a disposable atomizing mist infuser capsule's sealable outlet nozzle in accordance with one embodiment of the present invention.

FIG. 7 is a partially-sectionalized, exploded view of a one-piece, disposable, sealable capsule of an atomizing mist infuser in accordance with one embodiment of the present invention.

FIG. 7a is a partially-sectionalized, exploded view of a one-piece, disposable, sealable capsule of an atomizing mist infuser comprising a flow-restriction atomization means in accordance with one embodiment of the present invention.

FIG. 7b is a partially-sectionalized, exploded view of a one-piece, disposable, sealable capsule of an atomizing mist infuser comprising a flow restriction-atomization means in accordance with another embodiment of the present invention, and further comprising a means for regulating and controlling the inflow of an externally available high pressure system carrier fluid into the mist infuser capsule's reservoir.

DETAILED DESCRIPTION OF THE INVENTION

Figure 1:
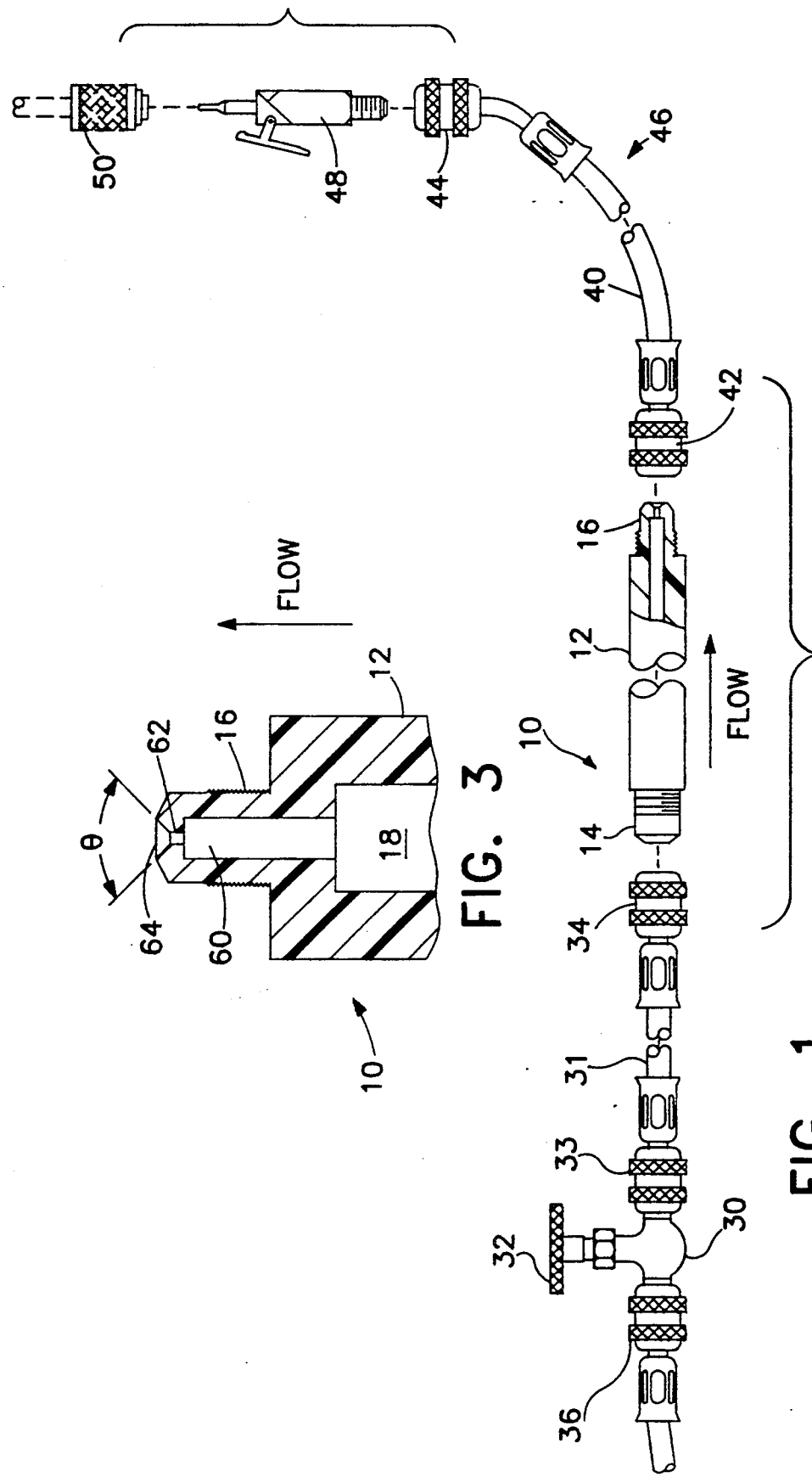
FIG. 1 is a partially-sectionalized, exploded view of a disposable atomizing mist infuser apparatus constructed in accordance with one embodiment of the present invention shown in association with equipment which can be used in conjunction therewith.

One embodiment of the present invention encompasses a novel mist infuser useful for infusing an atomized mixture into an operating, pressurized, closed-loop system (e.g., an air conditioning or refrigeration system). This novel mist infuser comprises a disposable capsule constructed and arranged to have a reservoir. In practice, this reservoir is pre-filled with a predetermined amount and concentration of a specific liquid material (e.g., a leak detection composition).

The disposable capsule of the novel atomizing mist infuser is also constructed and arranged to have a sealable inlet and outlet, wherein both are in open communication with the capsule's reservoir. When practicing one embodiment of the present invention, the capsule's sealable outlet is constructed and arranged for infusing an atomized mixture, comprising a high pressure system carrier fluid and the liquid material, from the capsule's reservoir into the closed-loop system.

When practicing another embodiment of the present invention, the capsule's sealable outlet means is constructed and arranged to have a flow restriction-atomization means attached thereto. This flow restriction-atomization means is constructed and arranged for infusing an atomized mixture into the closed-loop system.

When not in use, the mist infuser capsule's inlet and outlet are preferably sealed with a sealing means to prevent the contents within the capsule's reservoir from being exposed to the atmosphere. If the embodiment is employed wherein the capsule outlet means is constructed and arranged to have a flow restriction-atomization means attached thereto, this means can be employed as the means for sealing the capsule's outlet.

In a preferred practice, an operator or serviceman is furnished with a supply of sealed atomizing mist infusers in accordance with the present invention. These mist infusers are available with various capacities, concentrations and formulations of leak detection materials contained therein. The specific leak detection material, amount, and concentration will depend, in part, upon variables such as: the volume of refrigerant charged to the system, the type of refrigerant charged to the system, the type and charge of the refrigeration lubricant employed, and the like.

If desired, the disposable, atomizing mist infusers of the present invention can be color coded to identify their contents and capacity. They can also be designed with specific geometric shapes, each representing the contents contained therein.

In the aforementioned preferred practice, the novel design of the disposable, atomizing mist infusers of the present invention allows for the safe, atomized infusion of a specific leak detection composition into an operating, pressured closed-loop system through the use of an externally available high pressure system carrier fluid. By practicing the present invention, an atomized mixture comprising the pre-selected leak detection composition can be safely, efficiently, and economically introduced into an operating, pressurized closed-loop system without introducing substantially any contaminates (e.g., air or moisture) therein, and without having to encounter problems such as those associated with cross-contamination and those associated with filling and venting refillable mist infusers.

As stated above, a feature of one of the embodiment of the present invention is the novel atomizer design of the mist infuser capsule's sealable outlet means. This atomizer design is such that, when the disposable mist infuser capsule is filled with a liquid material and is positioned such that the capsule's unsealed outlet means is facing downward, substantially none of the liquid leak detection composition contained within the capsule's reservoir passes through the capsule's outlet means when subjected to normal gravitational forces. This feature is especially advantageous when coupling the mist infuser capsule's unsealed outlet means to a pressurized closed-loop system and/or when coupling the mist infuser capsule's unsealed inlet means to an external high pressure system carrier fluid supply.

Specifically, when coupling the aforementioned mist infuser embodiment to a pressurized closed-loop system and to a high pressure system carrier fluid supply, in a presently preferred practice, the mist infuser capsule's sealable outlet means is unsealed and connected to the operating, pressurized closed-loop system. Then, the mist infuser capsule is positioned such that the capsule's sealed inlet means is facing upward.

Thereafter, the mist infuser capsule's sealed inlet means is unsealed and connected to the high pressure system carrier fluid supply. It is important to note that, if more than an insignificant amount of the liquid material contained within the mist infuser capsule's reservoir was to flow out through the capsule's unsealed outlet means when connecting the capsule's unsealed inlet to the system carrier fluid supply, an air bubble or pocket would be formed within the reservoir in the space formerly occupied by the leak detection liquid. This air pocket, which is now trapped within the capsule's reservoir, can potentially contaminate and/or severely damage the pressurized, close-loop system being tested.

The novel atomizer design of the mist infuser capsule's outlet encompassed by this embodiment of the present invention is such that the leak detection composition contained within the capsule's reservoir does not flow through the capsule's unsealed outlet means when the liquid is subjected to normal gravitational forces. However, the design of this capsule's sealable outlet means is also such that, when pressure is supplied to the contents within the capsule's reservoir from the capsule's inlet means, the leak detection composition contained within the capsule's reservoir will be: (a) forced through the capsule's unsealed outlet means, (b) atomized, and (c) dispersed into the operating, pressurized closed-loop system.

The novel atomizer design of the mist infuser capsule's outlet means encompassed by this embodiment also prevents slugging from occurring within the compressor. Moreover, if the novel, disposable atomizing infuser is employed for dispersing a liquid leak detection composition, the atomization of the liquid leak detection composition by the capsule's outlet means increases the rate at which the leak detection composition is dispersed throughout the closed-loop system.

On the other hand, when coupling the mist infuser embodiment wherein the capsule outlet means is constructed and arranged to have a flow restriction-atomization means attached thereto, the preferred means of coupling this capsule to an operating, pressurized closed loop system and a high pressure system carrier fluid supply will depend upon the specific flow restriction-atomization means employed. This will be more fully explained later.

Referring now to the drawings, wherein like numerals indicate like elements, there is shown in FIG. 1 a disposable, atomizing mist infuser 10 capable of either hand held field operation or incorporation into automated filling sequences at a manufacturing factory. FIG. 1 is a partially-sectionalized, exploded view of atomizing mist infuser 10 in association with an example of equipment which can be used in conjunction therewith.

Mist infuser 10 comprises a cylindrical, disposable capsule 12 having a sealable inlet 14 and a sealable outlet 16. Capsule 12 is constructed and arranged to have a reservoir 18 which is in open communication with both capsule inlet 14 and outlet 16. Reservoir 18 is constructed and arranged to hold a predetermined amount of a liquid material (e.g., a liquid leak detection composition).

Disposable mist infuser capsule 12 can be made from any suitable material. Examples of suitable materials include, but are not limited to: plastics (e.g., injection-molded plastics, glass-filled nylons, fluorinated ethylene propylene polymers, high density polyethylenes, nylons, polypropylenes, polysulfones, ethylene, polytetrafluoroethylene, etc.), metals, and the like, and/or any combination thereof. However, since mist infuser capsule 12 is constructed and arranged to be disposable, it is preferably made of a relatively inexpensive material (e.g., a plastic).

The preferred material from which disposable mist infuser capsule 12 is made will depend, in part, on the leak detection composition contained therein and the operating pressure ranges of the system carrier fluid supply and the operating closed-loop system to which it will be connected. Moreover, in certain instances, it is preferred to be able to visually inspect the rate at which the contents of the capsule's reservoir 18 are being infused into the closed-loop system being tested. Under these circumstances, mist infuser capsule 12 can be at least partially made from a translucent and/or transparent material.

Preferably, the material from which mist infuser capsule 12 is made is substantially inert, and will not react with the material in, or passing through capsule reservoir 18. If the material in, and/or passing through, capsule reservoir 18 is a leak detection composition, an HFC refrigerant, a CFC refrigerant and/or a lubrication oil, there are a wide variety of suitable, commercially-available plastics from which capsule 12 can be made which will be apparent to those skilled in the art.

Referring again to FIG. 1, the specific means for regulating and controlling the inflow of an externally available high pressure system carrier fluid into the mist infuser capsule's reservoir 18 is regulating valve assembly 30. As stated before, any suitable regulating means can be employed.

In the embodiment illustrated in FIG. 1, valve assembly 30 contains adjustment knob 32. Valve assembly 30 is threadably secured, at one end, to supply hose 31 via nut 33. Supply hose 31 is then threadably secured to unsealed capsule inlet 14 via nut 34. This allows an externally available system carrier fluid supply to be admitted into capsule reservoir 18 through unsealed capsule inlet 14.

A supply hose 37 is threadably attached to the opposite end of valve assembly 30 via fitting 36. Hose 37 connects an externally available high pressure system carrier fluid source (not shown) to valve assembly 30. By employing this specific embodiment, system carrier fluid may be introduced into capsule reservoir 18 through regulating valve assembly 30 by turning adjustment knob 32. A flexible charging hose 40 and fasteners 42 and 44 together make up a charging hose assembly 46. One end of charging hose assembly 46 is threadably secured to unsealed capsule outlet 16 by threaded fastener 42. The opposite end of charging hose assembly 46 is removably attached to optional connection fitting 48 by fastener 44.

Male connection fitting 48 and female connection fitting 50 together make up a quick-disconnect coupler 51. Coupler 51 is provided for optional attachment with a system service port coupler (not shown) which is part of the pressurized closed loop system being tested for leaks. When the pressurized closed-loop system port fitting is equipped with a high pressure refrigeration valve, a quick-disconnect coupler (shown in phantom as item 51) is preferable. An example of such a suitable high pressure refrigeration valve is known in the industry as a Schrader-type refrigeration valve. This specific valve is commercially available from Schrader Automotive, Inc. of Nashville, Tenn. However, when the closed-loop system port fitting is equipped with a regulating needle valve, quick-disconnect coupler 51 is generally not necessary.

As stated earlier, atomizing mist infuser 10 comprises disposable capsule 12 which is constructed and arranged to have a reservoir suitable for holding various types and amounts of liquid materials (e.g, leak detection compositions). The atomizing mist infuser can be coupled to a variety of different configurations of various valves, fasteners and/or hoses so as to permit a technician or serviceman to infuse an atomized mixture into an operating, pressurized closed-loop system. Therefore, the use of the disposable mist infuser of the present invention is not limited to the specific design illustrated in FIG. 1.

The atomizing mist infuser of the present invention is particularly useful for holding various concentrations of leak detection compositions (e.g., fluorescent dyes per se, lubrication oils per se, and fluorescent dyes mixed with lubrication oils) and infusing these compositions, along with a system carrier fluid, into an operating, pressurized closed-loop system. When the atomizing mist infuser of the present invention is employed for infusing an atomized leak detection composition containing a fluorescent dye into an operating, pressurized closed-loop system, the following method is preferred.

An amount of a specific leak detection composition to be atomized into a particular pressurized closed loop system is determined. This determination will be based, in part, upon the charge, capacity and type of system refrigerant employed in the closed-loop system being tested (i.e., a CFC-based or an HFC-based refrigeration system) and/or the lubrication oil, type and volume charged therein.

The selected amount of the leak detection composition must be sufficient to result in a visible indication of a leak when exposed to an appropriate light source (e.g., a U.V. light), but not so great as to quench the fluorescent response of the leak detection material. Specifically, excessive amounts of the fluorescent leak detection material, in relation to the lubrication oil/refrigerant charge of the system, could quench the fluorescent response of the leak detection material.

The selection of the specific amount of the leak detection composition to be employed will be based, in part, on the following parameters: (a) number of pounds of refrigerant within the system being tested, (b) the amount (volume) of lubrication oil within the system being tested, (c) the specific refrigerant present in the system, and (d) the specific lubrication oil within the system. The refrigerant charge (i.e., pounds of refrigerant in the operating system) and type of system refrigerant employed (i.e., a CFC-based or HFC-based refrigeration system) are normally identified on the nameplate of the particular system equipment.

After taking the above into consideration, reference can then be made to the following table to determine the type, concentration and/or amount of a leak detection composition which can be infused into various closed-loop systems. This table is provided for illustrative purposes only and in no way is intended to limit the scope of the present invention.

The following table is based on closed-loop systems containing from one pound to 50 pounds of refrigerant. For such systems, the following formulations can be employed:

| FORM- | FORM- | FORM- | FORM- |
|---|---|---|---|

-continued

| ULA 1 | | ULA 2 | | ULA 3 | | ULA 4 | |
|---|---|---|---|---|---|---|---|
| 1 | | 5 | | 10 | | 25 | 50 |
| | | | POUNDS OF REFRIGERANT | | | | |

The above table shows, for example, that FORMULA 2 should be used in testing for leaks in a closed-loop system containing anywhere from about 5 to about 10 pounds of refrigerant. For systems containing over 50 pounds of the refrigerant, the preferred practice is to employ FORMULA 4 in addition to the appropriate combination of FORMULAS 1, 2, 3 and/or 4 to account for the total system charge. For example, if the closed-loop system refrigerant charge is 70 pounds, a technician or serviceman can use FORMULA 4 plus FORMULA 3.

Each Formula listed in the above table represents the following leak detection composition:

| | |
|---|---|
| Formula 1 = | 3-4 wt. % of fluorescent dye based upon 100 wt. % of total formula with the remainder comprising an appropriate refrigeration oil. Used for systems with a charge of 1-4.9 pounds of refrigerant. |
| Formula 2 = | 7-8 wt. % of fluorescent dye based upon 100 wt. % of total formula with the remainder comprising an appropriate refrigeration oil. Used for systems with a charge of 5-9.9 pounds of refrigerant. |
| Formula 3 = | 47-50 wt. % of fluorescent dye based upon 100 wt. % of total formula with the remainder comprising an appropriate refrigeration oil. Used for systems with a charge of 10-24.9 pounds of refrigerant. |
| Formula 4 = | 95-98 wt. % of fluorescent dye based upon 100 wt. % of total formula with the remainder comprising an appropriate refrigeration oil. Used for systems with a charge of 25-50 pounds of refrigerant. |

Each of the above Formulas are prepared using refrigeration lubricants which correspond to the recommendation of the equipment manufacturer for that particular system. After the proper formula has been determined, the appropriate disposable, atomizing mist infuser(s) containing the specific leak detection formulation is/are selected.

When received from the supplier, the disposable atomizing mist infusers are pre-filled with certain amounts and concentrations of liquid material. Moreover, the disposable mist infuser capsule's inlet and outlet means are preferably sealed to prevent the contents within the capsule's reservoir from contamination.

If sealed, any suitable sealing means can be employed. Examples of suitable sealing means include, but not limited to: caps, plugs, corks, adhesive seals (e.g., foil and/or foam), formed seals, and the like, and/or any combination thereof. The preferred sealing means will depend, in part, on the contents of the capsule's reservoir and the method in which the atomizing mist infuser will be interconnected to the closed-loop system and the high pressure carrier fluid supply.

Referring now to FIG. 2, it can be seen that capsule 12 sealable outlet 16 and sealable inlet 14 are threaded. Matingly threaded sealing cap 52 is constructed to seal outlet 16; and, matingly threaded sealing cap 54 is constructed to seal inlet 14. In a preferred embodiment, threaded sealing caps 52 and 54 comprise a resilient sealing means 55, sometimes referred to as a "center spot", gasket, O-ring, or "cushion" for sealing the juncture between the sealing cap and its respective capsule inlet or outlet.

If the disposable, sealed atomizing mist infuser is similar to that illustrated in FIG. 2, after it has been obtained, capsule outlet 16 is unsealed by removing outlet sealing cap 52. Specifically, sealing cap 52 is removed by unscrewing it from sealable capsule outlet 16. This particular unsealing procedure is preferably done when capsule 12 is oriented such that its outlet 16 facing upward. It should be noted that, at this point in the connecting operation, inlet sealing cap 54 is still threaded over capsule inlet 14.

The closed-loop system into which the selected leak detection composition is to be infused is examined. If the system service port is equipped with a system service port fitting which does not have a self-contained high pressure refrigeration valve (i.e., a Schrader-type valve), but has a regulating needle valve, the connection fitting 48 should be removed from fastener fitting 44. However, if the system service port fitting is equipped with a high pressure refrigeration valve, the charging hose assembly 46 should be used with connection male fitting 48 of quick-disconnect coupler 51 in place. Charging hose assembly 46 should then be attached to the system service port for whichever condition exists.

Charging hose assembly 46 is then purged of air by bleeding therethrough a small amount of refrigerant gas from the pressurized closed-loop system. Once charging hose assembly 46 is purged of air and substantially full of refrigerant gas, at zero pressure, the bleeding operation is preferably stopped. Then, fastener 42 is connected to capsule outlet means 16 in a manner such that the contents within capsule reservoir 18 are not contaminated by the ambient air. One method of accomplishing this objective is by securely attaching fastener 42 to the upwardly-directed, unsealed capsule outlet 16.

After fitting 42 is securely attached to capsule outlet 16, capsule 12 is oriented such that sealed inlet 14 is pointing substantially upward. Inlet sealing cap 54 is then unscrewed from capsule inlet 14. As stated earlier, capsule outlet 16 is designed to include an atomizer portion which, among other things, substantially prevents the liquid material contained within capsule reservoir 18 from flowing through unsealed capsule outlet 16 when the liquid material is subjected to normal gravitational forces.

A means for regulating and/or controlling the flow of a system carrier fluid is then opened such that a small stream of the carrier fluid is being bled therethrough and fills supply hose 31. Once hose 31 is filled with the system fluid carrier, fastener 34 is connected to capsule inlet 14 in a manner such that the contents in capsule reservoir 18 are not contaminated by the ambient air. Preferably, once hose 31 is filled with the system carrier fluid, the bleeding operation is stopped prior to connecting fastener 34 to capsule inlet 14.

FIG. *2a* illustrates another embodiment of a mist infuser encompassed by the present invention. Specifically, FIG. *2a* illustrates a mist infuser 10' having capsule 12' and outlet 16'. Outlet 16' of this particular embodiment is constructed and arranged to have a flow restriction-atomization means 17 securely attached thereto. Flow restriction-atomization means 17 comprises a flow restriction portion 19 and a flow atomization portion 21.

Figure 2:
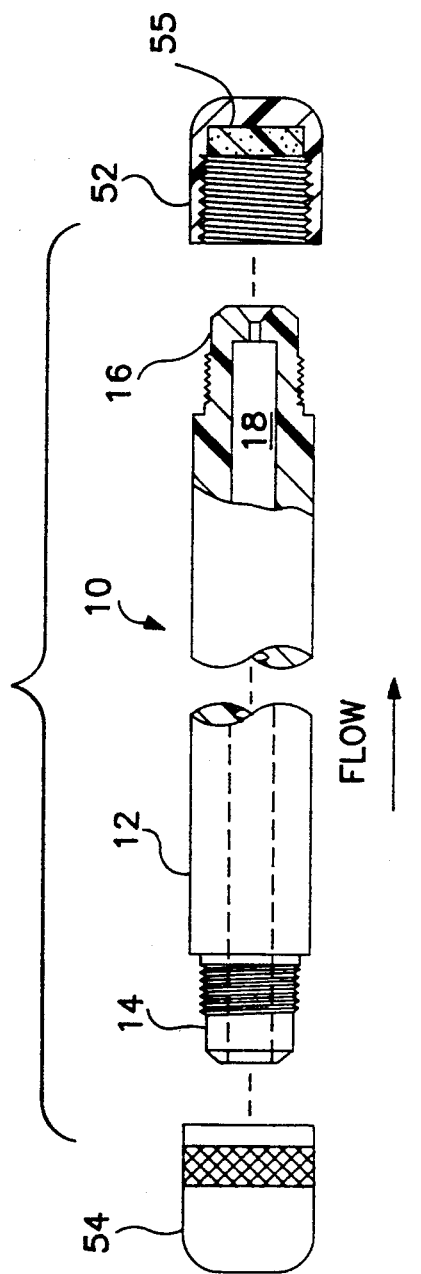
FIG. 2 is a partially-sectionalized, exploded view of a one-piece, disposable, sealable capsule of an atomizing mist infuser in accordance with one embodiment of the present invention.
Figure 2A:
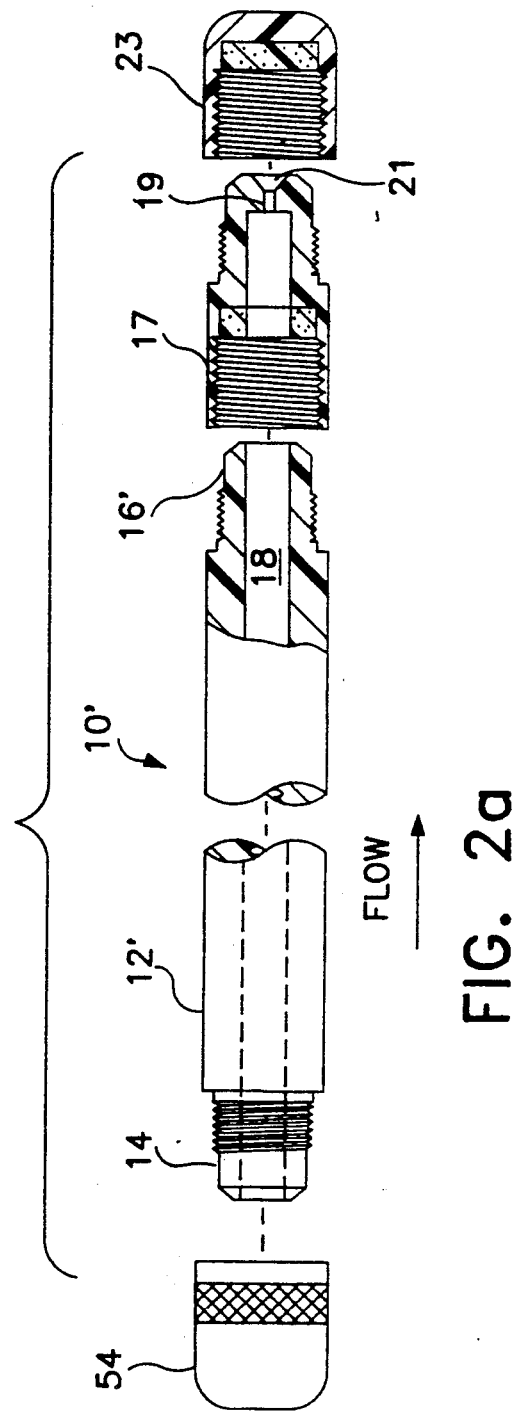
FIG. 2a is a partially-sectionalized, exploded view of a one-piece, disposable, sealable capsule of an atomizing mist infuser comprising a flow-restriction atomization means in accordance with one embodiment of the present invention.

In FIG. 2a, flow restriction-atomization means 17 is constructed and arranged to have a sealing means 23 attached thereto. In a preferred practice of the present invention, wherein the mist infuser employed is similar to that illustrated in FIG. 2a, prior to employing the capsule for mist infuser purposes, capsule reservoir 18 is filled with a liquid material; and the capsule inlet 14 and outlet 16' are sealed.

In the embodiment illustrated in FIG. 2a, capsule inlet 14 is sealed by sealing cap 54. However, capsule outlet 16' can be sealed either by flow restriction-atomization means 17 which has sealing cap 23 attached thereto, or by a sealing cap similar to item 52 of FIG. 2. In the former embodiment (i.e., where capsule outlet 16' is sealed by flow restriction-atomization means 17 and cap 23), one preferred method of connecting mist infuser capsule 12' to an operating, closed-loop system and an external high pressure carrier fluid supply is similar to that discussed above for FIG. 2. However, in the latter embodiment (i.e., where capsule outlet 16' is sealed by a cap similar to item 52 of FIG. 2), a few additional steps are necessary.

Specifically, if the mist infuser 12' is filled with a liquid material and capsule inlet 14 is sealed by cap 54 and capsule outlet 16' is sealed by a cap similar to item 52 of FIG. 2, one of the presently preferred methods of connecting mist infuser 10' to a closed-loop system and a system carrier fluid supply similar to that illustrated in FIG. 1 is as follows. First, flow restriction-atomization means 17 is secured to fastener 42 of hose assembly 46. Then, a small amount of refrigerant gas is bled through hose assembly 46 until hose 40 and flow restriction-atomization means 17 are filled with a refrigerant gas, at zero pressure. Once this occurs, the bleeding operation is preferably stopped. Thereafter, flow restriction-atomization means 17 is connected to capsule outlet means 16' in a manner such that the liquid, contents within capsule reservoir 18 are not contaminated by the ambient air.

One method of accomplishing the objective is by orienting mist infuser capsule 12' such that its outlet 16' is pointing in an upwardly direction. While in this position, capsule outlet 16' is unsealed. Then, flow restriction-atomization means 17, which is still filled with a refrigerant gas, at zero pressure, is connected to capsule outlet 16'.

After capsule outlet 16' is connected to the operating closed-loop system, the capsule inlet 14 is connected to the external system carrier fluid supply. One of the preferred methods of making this connection is similar to that discussed earlier.

The rate of infusion into the closed-loop system of the atomized mixture created by the system carrier fluid and leak detection composition is controlled, in part, by the atomizer orifice of the capsule outlet 16 or the flow restriction-atomization means 17. Therefore, rate of infusion can be altered by varying the size, shape and/or dimension of the atomizer orifice. In addition, rate of infusion can also be controlled, in part, by valves operated by a technician. These values, if present, would most likely be found on the carrier fluid supply source and/or on the manifold of a standard air conditioning-/refrigeration gauge set.

If the atomizing mist infuser of the present invention is made at least partially from a transparent and/or translucent material, the serviceman or technician can prevent slugging and can follow the system manufacturer's charging recommendations. This can be done by visually monitoring the flow of materials into the closed-loop system from the capsule reservoir.

Once the system is fully charged, and all the selected leak detection composition has been infused therein, the closed-loop system is sealed. The now empty mist infuser capsule is then disconnected from the changing hose assembly 46 and supply hose 31. After being disconnected, the empty mist infuser capsule is discarded. If an additional amount of a leak detection composition is necessary, another disposable, sealed, pre-filled atomizing mist infuser can be selected, connected to the carrier fluid supply and the closed-loop system, infused into the closed-loop system disconnected from the closed-loop system, and the carrier fluid supply, and then discarded as described above.

After the appropriate amount of the selected leak detection composition has been infused into the operating closed-loop system and allowed to circulate for a period of time, the system is examined for leaks. If the specific leak detection material employed contains a fluorescent compound, an ultraviolet light source can be used to locate leaks by detecting traces of escaping fluorescent material.

Large leaks should be detectable immediately. It should be noted, however, that very small leaks may require the system to be run for longer periods of time in order to allow the leak detection composition to migrate to an outside surface.

It can be seen that this invention not only solves the problems of improperly charging a large commercial system and inadvertently spilling fluorescent dye onto system equipment or onto the service personnel during the "fill and vent" procedures of the prior art mist infusers, but also avoids the aforementioned problems associated with cross-contamination. The novel mist infuser and method of using the same as encompassed by the present invention allow a predetermined amount of a specific leak detection composition to be efficiently infused, along with a system carrier fluid, into an operating, pressurized closed-loop systems. Thus, the venting of refrigerant to the atmosphere and the inadvertent spilling of fluorescent dye are kept to a minimum.

Referring now to FIG. 3, a cross-sectional view of an atomizing outlet nozzle design, in accordance with the present invention, is illustrated. The atomizing nozzle illustrated in FIG. 3 is designed as an integral part of mist infuser capsule's outlet 16. It should be noted, however, that this design can also be employed for a flow restriction-atomization means which is secured to mist infuser capsule's outlet 16' (see, e.g., item 17 of FIG. **2*a***).

The nozzle illustrated in FIG. 3 comprises the following portions: (a) flow introduction portion 60, (b) flow restriction portion 62, and (c) frustoconical-shaped countersunk flow atomization portion 64. The dimensions of nozzle portions 60, 62 and 64 depend, in part, on the specific viscosity and quantity of liquid material contained within mist infuser capsule's reservoir 18 and/or the desired rate of infusion of this material into the closed-loop system. When the contents of mist infuser capsule 12 is a commercially-available leak detection composition, and when the capacity of capsule 12 ranges from between about 0.01 to about 10 ounces, the preferred dimensions of nozzle portions 60, 62 and 64 are as follows:

(a) Flow introduction portion 60 preferably has a diameter ranging from between about 0.05 to about 1.0 inch, more preferably, from about 0.1 to about 0.5 inch;

(b) Flow restriction portion 62 preferably has a diameter ranging from between about 0.01 to about 0.2 inch, more preferably, from about 0.05 to about 0.1 inch; and, (c) The largest diameter of countersunk flow atomization portion 64 preferably ranges from between about 0.1 to about 0.3 inch. Generally, the largest diameter of nozzle countersunk portion is the same as the diameter of the flow introduction portion 60.

The angle, theta, of frustoconically-shaped countersunk flow atomization portion 64 preferably ranges from between about 60° to about 140°, more preferably, from about 80° to about 120°. Moreover, the axial length of flow restriction portion 62 (i.e., the distance between the downstream end of flow introduction portion 60 and the downstream end of countersunk flow atomization portion 64) preferably ranges from between about 0.05 to about 0.5 inch, more preferably from about 0.1 to about 0.2 inch. Finally, the axial length of flow introduction portion will generally range from between about zero to about 1.0 inch.

Figure 4:
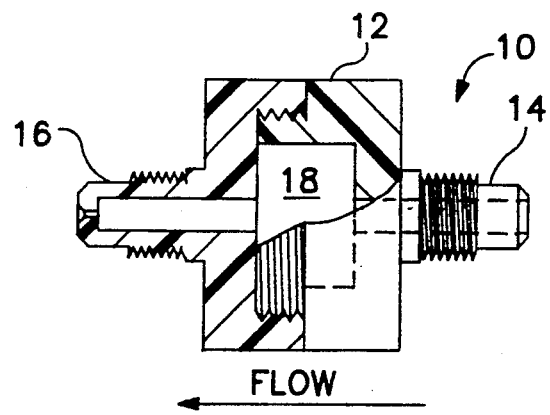
FIG. 4 is a partially-sectionalized, exploded view of a two-piece, disposable, capsule of an atomizing mist infuser (sealing means omitted) in accordance with one embodiment of the present invention.
Figure 5:
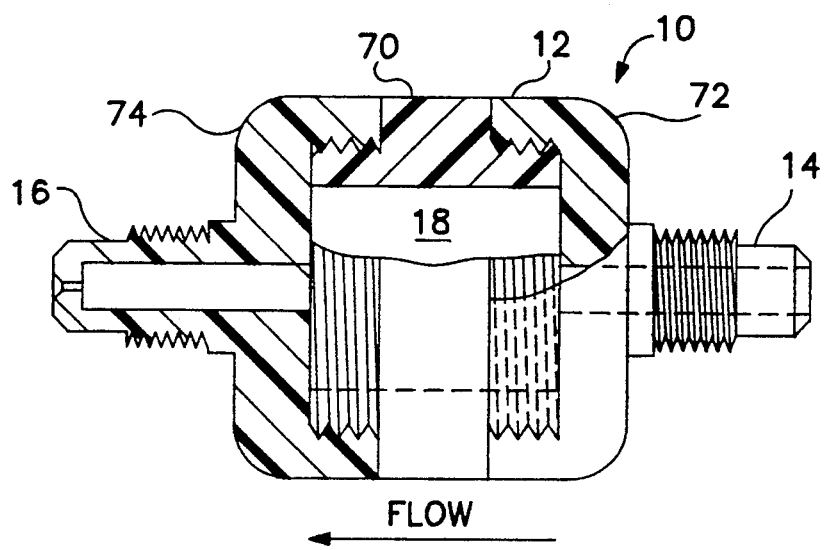
FIG. 5 is a partially-sectionalized, exploded view of a three-piece, disposable capsule of an atomizing mist infuser (sealing means omitted) in accordance with another embodiment of the present invention.
Figure 6:
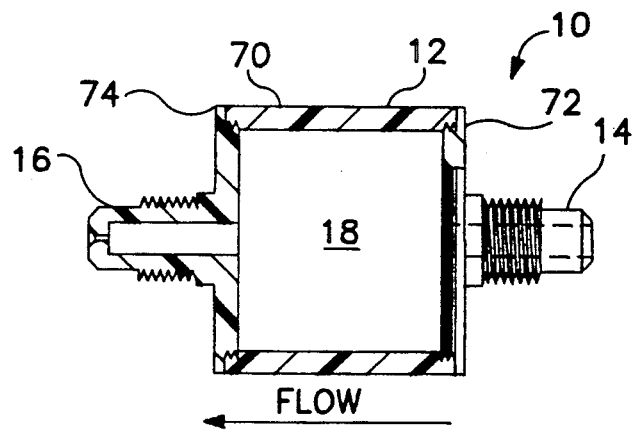
FIG. 6 is a partially-sectionalized, exploded view of a three-piece, disposable capsule of an atomizing mist infuser (sealing means omitted) in accordance with yet another embodiment of the present invention.

FIGS. 4, 5 and 6 are partially-sectionalized views of multi-piece capsule, disposable, atomizing mist infusers in accordance with other embodiments of the present invention. The embodiments illustrated in FIGS. 4, 5 and 6 do not show their specific sealing means.

As can be seen by comparing FIGS. 4, 5 and 6 to one another, their respective wall thicknesses and volumetric capacities differ. The preferred wall thickness will depend, in part, upon the maximum operating pressure encountered when infusing the atomized leak detection composition from mist infuser capsule's reservoir 18 into the operating, pressurized closed-loop system. Generally, the wall thickness should be such that mist infuser capsule 12 can withstand pressures ranging from between about 400 to about 600 PSI. The wall thickness of mist infuser capsule 12 will also depend, in part, on the specific material from which the capsule is constructed.

By employing the multi-piece mist infuser capsule designs illustrated in FIGS. 4, 5 and 6, pre-filling the capsule reservoir 18 can be simplified. Moreover, instead of making the disposable mist infuser capsule entirely from a transparent and/or translucent material, a transparent or translucent body portion 70 can be positioned between capsule end portions 72 and 74 (see, for example, FIGS. 5 and 6).

FIGS. 7, 7a and 7b illustrate even further embodiments of mist infusers encompassed by the present invention. Referring now to FIG. 7, a mist infuser 80 is illustrated. Mist infuser 80 comprises capsule 82, capsule reservoir 18, and sealable inlet and outlet 84 and 86, respectively, which are in open communication with capsule reservoir 18. Matingly threaded sealing caps 88 and 90 are constructed to seal capsule inlet 84 and outlet 86, respectively. As stated before, in a preferred embodiment, threaded sealing caps 88 and 90 also comprise a resilient sealing means 55.

Capsule outlet 86 of mist infuser 80 is equipped with a high pressure refrigeration valve 92. In the specific embodiment illustrated in FIG. 7, the high pressure refrigeration valve 92 is a Schrader-type valve. Valve 92 is threaded into the capsule outlet 86.

Valve 92 acts as the flow restriction and flow atomization means of mist infuser 80. Specifically, valve 92 acts as a flow restriction means in that, as it is in its closed position, any contents contained within reservoir 18 will be prevented from flowing out through capsule outlet 86 when outlet 86 is unsealed, and when the contents within reservoir 18 are subjected to normal gravitational forces. On the other hand, valve 92 also acts as a flow atomization means in that, as it is in its open position (not shown), the contents of capsule reservoir 18 will be atomized when forced to flow out through capsule outlet 86.

If mist infuser 80 is incorporated into a system similar to that illustrated in FIG. 1, fitting 42 would contain some means for opening valve 92 and keeping the valve open as long as fitting 42 is secured to capsule outlet 86. Since the sealing feature provided by valve 92 is a mechanical-type seal which is opened simultaneously by fastener 42, the capsule's inlet and outlet can be connected to fasteners 34 and 42, respectively, in any order.

In the embodiment illustrated in FIG. 7, it is within the scope of the present invention to have a similar type of high pressure refrigeration valve incorporated into capsule inlet 84. As with valve 92 in capsule outlet 86, the value incorporated into capsule inlet 84 will be in a generally closed position; thus, sealing the contents of capsule reservoir 18 from the ambient atmosphere.

If mist infuser 80 has a high pressure valve incorporated into its inlet 84, and is employed for purposes of mist infusion into a system similar to that illustrated in FIG. 1, fitting 34 would contain some means for opening this valve and keeping the valve open as long as fitting 34 is secured to capsule inlet 84. Although employing such high pressure valves would add to the cost of the disposable mist infuser encompassed by the present invention, they would simplify connecting and disconnecting the novel mist infuser's inlet and outlet from the system carrier fluid supply and the operating closed-loop system, respectively.

FIG. 7a illustrates yet another embodiment of a mist infuser encompassed by the present invention. Specifically, the embodiment illustrated in FIG. 7a incorporates some of the features of mist infuser 10' (see, FIG. 2a) and mist infuser 80 (see, FIG. 7).

FIG. 7a illustrates mist infuser 94 which comprises capsule 96, capsule reservoir 18, and sealable inlet and outlet 98 and 100, respectively, which are both in open communication with capsule reservoir 18. A matingly threaded sealing cap 102 is constructed to seal capsule inlet 98. Although not shown, capsule outlet 100 can also have a matingly threaded sealing cap associated therewith which is similar to sealing cap 102.

In the specific embodiment illustrated in FIG. 7a, capsule outlet 100 is constructed and arranged to have a flow restriction-atomization means 104 attached thereto. Flow restriction-atomization means 104 is similar in form and function to flow restriction-atomization means 17 illustrated in FIG. 2a. The main difference between the flow restriction-atomization means illustrated in FIGS. 2a and 7a is that, the means illustrated in FIG. 7a comprises a high pressure valve 105 (e.g., a Schrader-type valve), wherein the means illustrated in FIG. 2a has a specific internal design which designs a flow restriction portion and a flow atomization portion.

It should also be noted that, as in FIG. 7, flow restriction-atomization means 104 can, optionally, have a sealing cap 90 threadedly secured thereto. Also, capsule inlet 98 can, optionally, have a similar high pressure valve incorporated therein.

FIG. 7b illustrates even a further embodiment of a mist infuser encompassed by the present invention. Specifically, FIG. 7b illustrates mist infuser 110 which comprises capsule 112, capsule reservoir 18 and sealable inlet and outlet 114 and 116, respectively, which are both in open communication with capsule reservoir 18. Although not shown, capsule inlet 114 and outlet 116 can each have a matingly threaded sealing cap associated therewith which is similar to sealing cap 102 of FIG. 7a.

In the specific embodiment illustrated in FIG. 7b, capsule inlet 114 is constructed and arranged to accept flow regulation means 118. Flow regulation means 118 has high pressure valve 120 incorporated therein. Moreover, capsule outlet 116 is constructed and arranged to accept flow restriction-atomization means 122. Flow restriction-atomization means 122 also has a high pressure valve 124 incorporated therein.

The manner of incorporating mist infuser 80, 94 or 110 into a system similar to that illustrated in FIG. 1, will depend, in part, upon the form in which the mist infuser is received from the supplier. For example, the specific mist infuser can be received as a pre-filled capsule wherein the capsule's inlet and outlet are sealed by matingly threaded sealing caps. Moreover, the mist infuser can have a high pressure valve incorporated into its inlet and/or outlet. Furthermore, the mist infuser can have its inlet sealed by flow regulation similar to item 118 of FIG. 7b and/or its outlet sealed by a flow restriction-atomization means similar to item 122 of FIG. 7b.

The above illustrates merely some of the different forms in which a mist infuser, which is encompassed by the present invention, can be received from a supplier. However, regardless of the form in which mist infuser is received, when it is being connected to a system similar to that illustrated in FIG. 1, any method can be employed which does not result in contaminating the contents of capsule reservoir 18.

According to the figures of the present invention, the disposable mist infusers comprise a capsule which has threaded and flared inlets and outlets which are designed for accepting at least one of the following: a sealing means (see, FIGS. 2, 2a, 7 and 7a), a flow restriction-atomization means (see, FIGS. 2a, 7 and 7a), and/or fasteners for correcting and disconnecting the mist infuser to a carrier fluid supply and/or an operating closed-loop system (see, FIGS. 1 and 7a). It should be noted, however, that either the capsule's inlet or outlet or both can be adapted to accept any other type of suitable fastening means (i.e., other than a flared-threaded connection). For example, another suitable fastening means is a quick-release fitting.

The specific fastening means employed can also be varied to insure that the contents of the capsule do not get inadvertently charged into the wrong system. For example, capsules whose contents are designed for infusion into HFC-based systems can have a fastening means which is different from those capsules whose contents are designed for CFC-based systems (e.g., one type can have a metric thread while the other has a standard thread). The preferred means of fastening the disposable atomizing mist infuser to a closed-loop system and/or to a high pressure carrier fluid supply depends, in part, on the specific desires of the user.

As can also be seen from FIGS. 2 and 4-6 of the present invention, the inlet 14 of the atomizing infuser capsule 12 does not define an atomizer as does its outlet counterpart 16. Rather, inlet 14 of the capsules illustrated in these Figures is designed to provide virtually unrestricted flow of the high pressure system carrier fluid from its external source to capsule reservoir 18.

The present invention may be embodied in other specific forms without departing from the spirit or essential attributes thereof and, accordingly, reference should be made to the appended claims, rather than to the foregoing specifications, as indicating the scope of the invention.

We claim:

1. A disposable atomizing mist infuser for infusing an atomized mixture into an operating, pressurized, closed-loop system, said atomizing mist infuser comprises:
   (a) a capsule constructed and arranged to have a reservoir, a sealable inlet means and a sealable outlet means, wherein said sealable inlet and outlet means are in open communication with said capsule reservoir, said capsule reservoir being constructed and arranged to hold a predetermined amount of a liquid material, and wherein said sealable capsule outlet means being constructed and arranged:

(i) to substantially prevent the liquid material held in said capsule reservoir from flowing through said sealable capsule outlet means when said outlet means is unsealed and when the liquid material is subjected to normal gravitational forces, and (ii) to atomize the liquid material held in said capsule reservoir as the liquid material is forced, under pressure, to pass through said sealable capsule outlet means when said outlet means is unsealed;

(b) means for coupling said sealable capsule inlet means to an externally available high pressure system carrier fluid supply; and (c) means for coupling said sealable capsule outlet means to said operating, pressurized closed-loop system.

2. A mist infuser according to claim 1, wherein said mist infuser includes selectively removable sealing means for said capsule inlet and outlet means.

3. A mist infuser according to claim 2, wherein said removable sealing means comprises a first threaded cap which threadingly mates with threads on said sealable capsule outlet means, and a second threaded cap which threadingly mates with threads on said sealable capsule inlet means.

4. A mist infuser according to claim 3, wherein the mist infuser capsule reservoir is filled with a liquid material, and wherein said capsule outlet and inlet means are sealed by said first and second threaded caps, respectively.

5. A mist infuser according to claim 4, wherein said liquid material is a leak detection composition comprising a fluorescent dye capable of being detected in the presence of ultraviolet light.

6. A mist infuser according to claim 5, wherein said liquid material further comprises a refrigeration lubricant.

7. A plurality of mist infusers according to claim 4 wherein the capsule of each mist infuser is color coded to identify the specific liquid material contained therein.

8. A plurality of mist infusers according to claim 4 wherein each mist infuser has a geometric shape to identify the specific liquid material contained therein.

9. A mist infuser according to claim 1, wherein said capsule outlet means comprises a high pressure refrigeration valve which, when in its closed position, substantially prevents liquid material held in said capsule reservoir from flowing through said capsule outlet means when said outlet means is unsealed, and when the liquid material is subjected to normal gravitational forces.

10. A mist infuser according to claim 1, wherein said capsule inlet means comprises a high pressure refrigeration valve which, when in its closed position, substantially prevents liquid material held in said capsule reservoir from flowing through said capsule inlet means when said inlet means is unsealed, and when the liquid material is subjected to normal gravitational forces.

11. A mist infuser according to claim 10, wherein said capsule outlet means comprises a high pressure refrigeration valve which, when in its closed position, substantially prevents liquid material held in said capsule reservoir from flowing through said capsule outlet means when said outlet means is unsealed, and when the liquid material is subjected to normal gravitational forces.

12. A mist infuser according to claim 10, wherein said capsule comprises means for permitting the visual observation of said liquid material held within said capsule reservoir.

13. A mist infuser according to claim 1, wherein said means for coupling said sealable capsule inlet means to an externally available high pressure system carrier fluid supply comprises a flow regulation means attached to said capsule inlet means, said flow regulation means comprising a high pressure refrigeration valve which, when in its closed position, substantially prevents liquid material held in said capsule reservoir from flowing through said capsule inlet means, when said inlet means is unsealed, and when the liquid material is subjected to normal gravitational forces.

14. A mist infuser according to claim 1, wherein said capsule comprises means for permitting the visual observation of said liquid material held within said capsule reservoir.

15. A mist infuser according to claim 14, wherein said capsule is at least partially made from a transparent or translucent material.

16. A disposable atomizing mist infuser for infusing an atomized mixture into an operating, pressurized, closed-loop system, said atomizing mist infuser comprises:
   (a) a capsule constructed and arranged to have a reservoir, a sealable inlet means and a sealable outlet means, wherein said sealable inlet and outlet means are in open communication with said capsule reservoir, said capsule reservoir being constructed and arranged to hold a predetermined amount of a liquid material, and said capsule outlet means being constructed and arranged to have a flow restriction-atomization means securely attached thereto, the flow restriction-atomization means comprising:
      (i) a flow restriction portion being constructed and arranged to substantially prevent any liquid material held in said capsule reservoir from flowing through the flow restriction-atomization means when said outlet means is unsealed, when the flow restriction-atomization means is secured thereto, and when the liquid material contained in said capsule reservoir is subjected to normal gravitational forces, and
      (ii) a flow atomization portion constructed and arranged to atomize any liquid material held in said capsule reservoir as the liquid material is forced, under pressure, to pass through said sealable capsule outlet means and the flow restriction-atomization means when said outlet means is unsealed, and when the flow restriction-atomization means is attached thereto;
   (b) means for coupling said sealable capsule inlet means to an externally available high pressure system carrier fluid supply; and
   (c) means for coupling said sealable capsule outlet means to said operating, pressurized closed-loop system.

17. A mist infuser according to claim 16, wherein said means for coupling said sealable capsule outlet means to said operating pressurized closed-loop system comprises a flow restriction-atomization means securely attached to said capsule outlet means.

18. A mist infuser according to claim 17, wherein said flow restriction-atomization means includes a selectively removable sealing means for sealing the contents of said capsule reservoir from the ambient air.

19. A mist infuser according to claim 18, wherein said flow restriction-atomization's removable sealing means comprises a threaded cap which threadingly mates with threads on said flow restriction-atomization means flow atomization portion.

20. A mist infuser according to claim 17, wherein said flow restriction-atomization means comprises a high pressure refrigeration valve which, when in its closed position, substantially prevents liquid material held in said capsule reservoir from flowing through said capsule outlet means when said outlet means is unsealed, and when the liquid material is subjected to normal gravitational forces.

21. A mist infuser according to claim 16, wherein said capsule inlet means comprises a high pressure refrigeration valve which, when in its closed position, substantially prevents liquid material held in said capsule reservoir from flowing through said capsule inlet means when said inlet means is unsealed, and when the liquid material is subjected to normal gravitational forces.

22. A mist infuser according to claim 21, wherein said flow restriction-atomization means comprises a high pressure refrigeration valve which, when in its closed position, substantially prevents liquid material held in said capsule reservoir from flowing through said capsule outlet means when said outlet means is unsealed, and when the liquid material is subjected to normal gravitational forces.

23. A mist infuser according to claim 22, wherein said capsule comprises means for permitting the visual observation of said liquid material held within said capsule reservoir.

24. A mist infuser according to claim 16, wherein said means for coupling said sealable capsule outlet means to said operating pressurized closed-loop system comprises a flow restriction-atomization means securely attached to said capsule outlet means.

25. A mist infuser according to claim 16, wherein said mist infuser includes selectively removable sealing means for said capsule inlet and outlet means.

26. A mist infuser according to claim 25, wherein said capsule's removable sealing means comprises:
   (a) a first threaded cap which threadingly mates with threads on said sealable capsule outlet means, and
   (b) a second threaded cap which threadingly mates with threads on said sealable capsule inlet means.

27. A mist infuser according to claim 25, wherein said capsule's removable sealing means comprises:

(a) a flow restriction-atomization means which threadingly mates with threads on said sealable capsule outlet means, and which has a first threaded cap which threadingly mates with said flow restriction-atomization means flow atomization portion, and (b) a second threaded cap which threadingly mates with threads on said sealable capsule inlet means.

28. A mist infuser according to claim 25, wherein the mist infuser capsule reservoir is filled with a liquid material, and wherein said capsule outlet and inlet means are sealed by said removable sealing means.

29. A mist infuser according to claim 28, wherein said liquid material is a leak detection composition comprising a fluorescent dye capable of being detected in the presence of ultraviolet light.

30. A mist infuser according to claim 29, wherein said liquid material further comprises a refrigeration lubricant.

31. A mist infuser according to claim 16, wherein said capsule comprises means for permitting the visual observation of said capsule reservoir.

32. A mist infuser according to claim 31, wherein said capsule is at least partially made from a transparent or translucent material.

33. A method for infusing an atomized liquid material into an operating, pressurized closed-loop system, said method comprising the steps of:

(a) selecting an atomizing mist infuser comprising a pre-filled liquid filled disposable capsule having a sealable inlet means sealed by an inlet sealing means, and a sealable outlet means sealed by an outlet sealing means, said disposable capsule constructed and arranged to have a reservoir containing a predetermined amount and concentration of said liquid to be infused into a closed-loop system, and said capsule inlet means and outlet means being in open communication with said capsule reservoir;

(b) connecting said capsule outlet means to the closed-loop system;

(c) connecting an externally available high pressure system carrier fluid supply to said capsule inlet means to form a high pressure mixture comprising said liquid material and said system carrier fluid; and (d) infusing as a mist a selectively regulated amount of said high pressure mixture into said closed-loop system.

34. A method according to claim 33 which further comprises the steps of:

(a) removing said outlet sealing means from said capsule outlet means without the introduction of a substantial amount of ambient air into said capsule reservoir;

(b) connecting said unsealed capsule outlet means to the closed-loop system via a system connecting means without the introduction of a substantial amount of ambient air into either the closed-loop system or said capsule reservoir;

(c) positioning said capsule such that said sealed capsule inlet means is pointing upward;

(d) removing said inlet sealing means from said capsule inlet means without the introduction of a substantial amount of ambient air into said capsule reservoir; and (e) connecting said unsealed capsule inlet means to said supply of said externally available high pressure system carrier fluid via a carrier fluid connecting means without the introduction of a substantial amount of ambient air into either the closed-loop system or said capsule reservoir.

35. A method according to claim 34, further comprising the steps of:

(a) purging the system connecting means of air prior to connecting said unsealed capsule outlet means thereto; and (b) purging said carrier fluid connecting means of air prior to connecting said unsealed capsule inlet means thereto.

36. A method according to claim 33, further comprising the step of selectively regulating the inflow of said high pressure system carrier fluid being supplied into said capsule reservoir.

37. A method according to claim 33, further comprising illuminating said infused closed-loop system with an ultraviolet light source to permit visual observation of said infused closed-loop system for leaks.

* * * * *